Aug. 9, 1932.  C. E. JOHNSON  1,870,913
CULTIVATING IMPLEMENT
Filed May 6, 1929

WITNESS
Walter Ackerman

INVENTOR
Christian E. Johnson
BY Brown, Jackson, Boettcher & Dienner
ATTORNEYS

Patented Aug. 9, 1932

1,870,913

UNITED STATES PATENT OFFICE

CHRISTIAN E. JOHNSON, OF MOLINE, ILLINOIS, ASSIGNOR TO DEERE & COMPANY, OF MOLINE, ILLINOIS, A CORPORATION OF ILLINOIS

CULTIVATING IMPLEMENT

Application filed May 6, 1929. Serial No. 360,851.

This invention relates to cultivating implements of the type commonly known as rotary hoes. Such implements usually comprise a wheeled frame having two transversely extending shafts on which closely spaced rotating hoe wheels are mounted, the latter having long, radially extending teeth adapted to enter the soil in the forward rolling motion of the hoe wheels over the ground. Such implements are frequently used in the cultivation of corn and like plants, having particular utility for breaking up crusty soil in the first or second cultivating operations.

The implement of my present invention is characterized by the use of adjustable supporting wheels for the main or rear portion of the frame, which wheels serve to govern the depth of penetration of the hoe wheels and also to support the hoe wheels in elevated position clear of the ground when the implement is to be transported from place to place, the implement being further characterized by the use of a tongue truck for supporting a forwardly extending portion of the implement frame and also for supporting the draft pole, said tongue truck being provided with the usual supporting wheel or wheels.

The principal object of my invention is the provision of new and improved means for raising and lowering the frame of the implement substantially parallel to itself, preferably in the form of a single actuating device which will simultaneously raise or lower both the rear portion of the frame and the front portion of the frame with respect to the rear supporting wheels and the tongue truck supporting wheel respectively.

Another object of the invention is the provision of improved means whereby when the implement has been lowered to operating position the rear supporting wheels may be raised off of the ground to add their weight to the weight of the implement for obtaining greater penetration of the hoe wheels, and whereby the forward portion of the frame is held at a substantially fixed height for supporting the draft pole during such raising of the rear supporting wheels from the ground.

In this regard it is a further object to provide stop means for preventing continued downward movement of the forward portion of the frame after it has reached a predetermined position in its downward movement.

Figure 1:
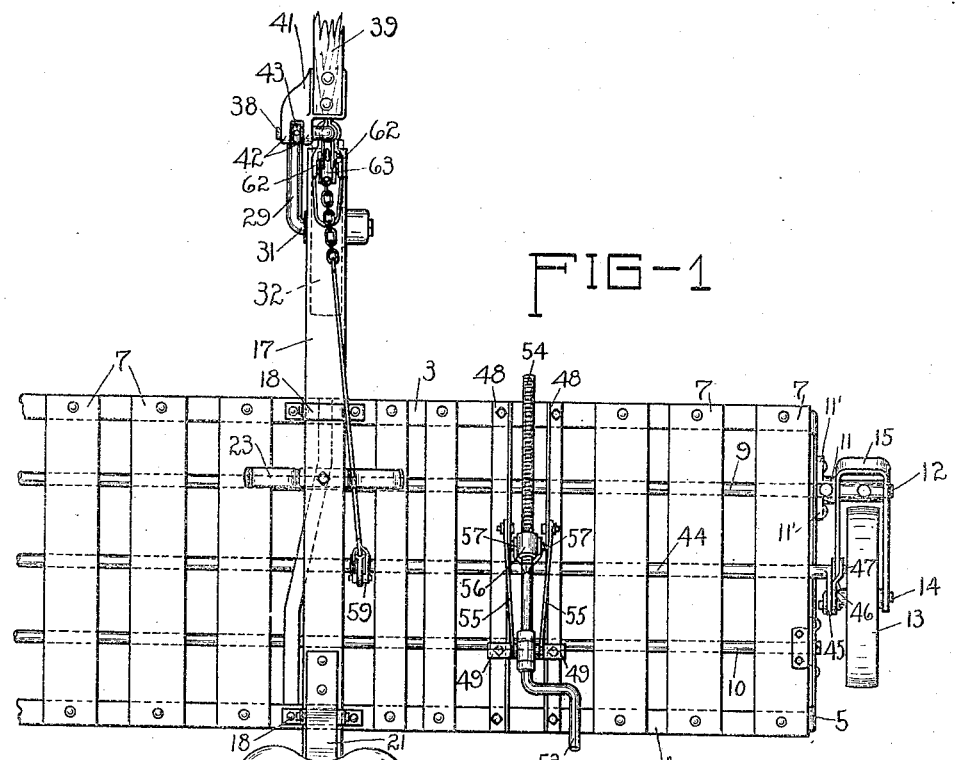
Figure 2:
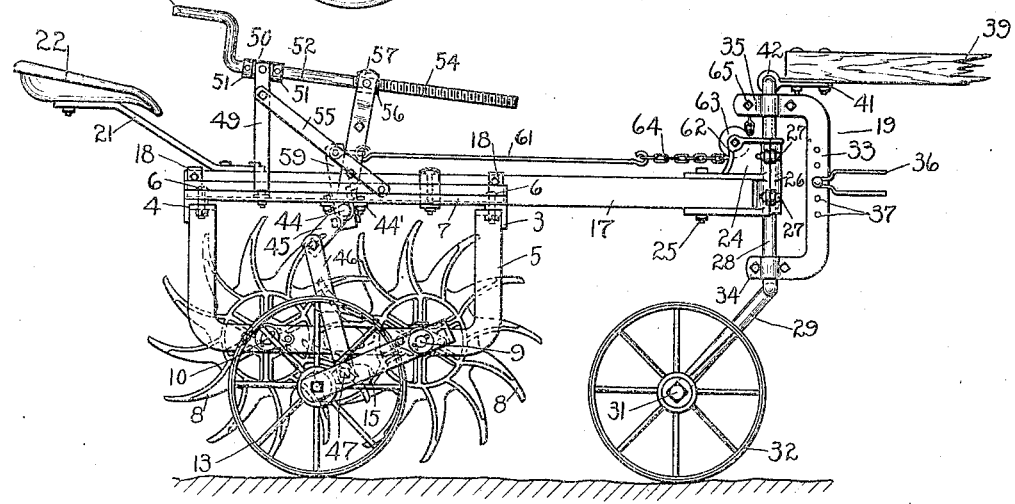

Other objects and advantageous features will appear from the following description of a preferred embodiment of my invention as illustrated in the accompanying drawing, in which:

Fig. 1 is a plan view of the greater portion of a rotary hoe embodying my invention, one side thereof being broken away, and with the rotary hoe wheels omitted to avoid obscuring the illustration; and Fig. 2 is a side view thereof, showing the position of the parts with the frame in its raised position and the hoe wheels in transport position.

The frame of the implement comprises a transversely extending front angle bar 3 and a transversely extending rear angle bar 4, which angle bars are connected at their ends by longitudinally extending U-shaped frame members 5, said frame members being suitably secured to said angle bars as by bolts 6 (see Fig. 2). The angle bars 3 and 4 are also connected together by boards 7, (see Fig. 1), which form a platform for the reception of weights to cause the hoe wheels to penetrate the soil to the desired depth when, owing to the condition of the soil, the weight of the implement alone is not sufficient for this purpose.

The mounting of the hoe wheels, and of the supporting wheels for the rear portion of the frame, is similar in construction to that shown and described in the application of Carl F. Bauer, filed January 28, 1928, Serial No. 250,205, so that these parts will be but briefly described herein. The hoe wheels indicated at 8 are arranged in front and rear rows or series, with the wheels of one series disposed in staggered relation with respect to the other series, and the two series of wheels overlapping each other transversely of the implement. The front series of wheels are mounted on a transversely extending shaft 9, while the rear series are mounted on a transversely extending shaft 10. The end portions of the shaft 9 extend through openings in the side frame members 5 and are supported in bearings 11 having mounting flanges 11' suitably secured to the outer sides of the frame members 5. The shaft 10 is supported in suitable bearings in the side frame members. The ends of the shaft 9 project outwardly beyond the side frame members 5, as indicated at 12 in Fig. 1, and provide means for mounting the side or rear supporting wheels 13. Inasmuch as the mounting of these wheels, and the mechanism for adjusting the same, is the same at both sides of the implement only that at one side has been illustrated, and a description of that one will suffice. The wheel 13 is supported on an axle 14 mounted in a U-shaped bracket or yoke 15, which yoke is pivoted at its upper end on the outwardly projecting end 12 of the shaft 9, said wheel being mounted between the arms of said yoke at the lower end thereof.

The frame of the implement also comprises a longitudinally extending beam or member 17 suitably secured to the front and rear angle bars 3 and 4 by U-shaped clips 18, said member being positioned approximately midway between the sides of the implement and projecting forwardly therefrom. The member 17 is supported at its forward end on a tongue truck, indicated in its entirety by the reference numeral 19. Suitably secured to the member 17 near the rear end thereof is a seat spring 21, upon the upper end of which is mounted a driver's seat 22, and 23 indicates the usual foot rest suitably secured to the central, longitudinally extending frame member 17.

Referring now to the construction of the tongue truck 19 which supports the forward end of said frame member 17, 24 indicates a mounting member in the form of a casting which is secured to said frame member 17 at its forward end in any suitable manner, as by a bolt 25 (see Fig. 2). The front side of the casting 24 is provided with a vertical semicylindrical recess, which, in conjunction with a semicylindrical half-bearing 26 bolted to the casting 24 by bolts 27, forms a vertical bearing for a spindle 28. Said spindle is provided with a downwardly and rearwardly inclined arm portion 29 having a horizontally turned portion 31 which forms an axle for a supporting wheel 32. Said tongue truck also comprises an approximately C-shaped draft link 33, the lower portion 34 of which is rigidly clamped to the spindle 28 between the arm 29 thereof and the casting 24, while its upper portion 35 is rigidly clamped to the spindle 28 above the casting 24, as shown in Fig. 2.

Draft is applied to the draft link 33 through a clevis 36, which may be bolted in any one of a series of vertically spaced holes 37, said series of holes being provided for adjusting the height of draft hitch as will be readily understood.

At its upper end, above the arm 35 of the draft link 33, the spindle 28 is provided with a horizontally projecting arm or member 38, and a pole 39 is pivotally mounted thereon for vertical movement by means of a casting 41 suitably bolted to the pole 39 as shown, and having a pair of rearwardly extending projections 42, through perforations in which projections the horizontal member 38 of the spindle 28 passes, as shown in Fig. 1. A collar 43 is clamped to said member 38 between the projections 42 to hold the pole 19 in place on the member 38.

The means for raising and lowering the frame with respect to its rear supporting wheels comprises a rock shaft 44 which extends transversely of the machine and is rotatably mounted at its ends in hanger brackets 44', which are suitably secured to the frame at the sides and intermediate portions thereof. Fixedly secured to each end of said rock shaft so as to oscillate therewith is a downwardly and rearwardly extending crank arm 45, and pivotally connected with the lower end of each of said crank arms is a downwardly and forwardly extending connecting bar or link 46, each of said links being pivotally connected at its lower end to the adjacent yoke 15 at 47.

Extending longitudinally of the implement frame and suitably secured thereto at one side of the member 17 is a pair of spaced angle bars 48, as shown in Fig. 1. Suitably secured to said angle bars 48 and extending upwardly therefrom is a pair of spaced bars 49 forming a supporting bracket, and between the upper ends of said bars a bearing sleeve or head 50 is pivotally mounted for vertical rocking movement. Rotatably mounted in said bearing head is a screw shaft 52 provided with a crank handle portion 53 at its rear end adjacent to the driver's seat 22, and provided at its forward end with a screw-threaded portion 54. Collars 51 are pinned to the screw shaft 52 on opposite sides of the pivoted bearing sleeve 50 for holding the screw shaft against endwise movement in the bearing sleeve. Each of the supporting brackets 49 is suitably braced by a brace bar 55, as shown in Fig. 2.

Mounted on the threaded portion 54 of the crank screw 52 is a traveling nut 56, said nut being pivotally mounted between spaced side members 57 at the upper end of a crank arm 58, the lower end of which is suitably secured to the rock shaft 44 in any convenient manner so as to oscillate said rock shaft.

The means for raising and lowering the forward end of the frame member 17 with respect to the tongue truck supporting wheel comprises a crank arm 59 secured at its lower end to the rock shaft 44, so as to rock therewith, and extending upwardly therefrom between one of the boards 7 and said frame member 17.

Suitably secured to the upper end of the crank arm 59 is a long link 61 which extends forwardly from said crank arm to a point adjacent to the mounting casting 24. Said casting is provided, in rear of the vertical spindle bearing portion previously described, with two upwardly extending side flanges 62 between which is suitably mounted a roller or sheave 63. Connected to the forward end of the long link 61 is a chain 64, which chain passes around the under side of the sheave 63 and upwardly in front thereof, and the opposite end of said chain is suitably connected at 65 to the inner end of the upper portion 35 of the U-shaped draft link 33, as shown in Fig. 2, which upper portion 35 is made long enough to provide for such connection.

The operation of the implement is as follows:

With the frame in the raised position shown in Fig. 2 the hoe wheels 8 are clear of the ground, corresponding to transport condition of the implement. When it is desired to lower the hoe wheels to cultivating position the crank screw 52 is turned in the proper direction and the traveling nut 56 will move forward on the threaded end of said crank screw. This will move the crank arm 58 forward, rotating the rock shaft 44, and through the rock shaft and the crank arms 45 will be swung rearwardly and upwardly while the crank arm 59 will be swung forwardly. As the crank arms 45 move rearwardly and upwardly by their connection with the wheel yokes 15 through the connecting links 46 they raise the wheels 13 upwardly with respect to the frame, thereby lowering the rear portion of the frame with respect to the ground and bringing the hoe wheels down into operative position.

Simultaneously with the lowering of the rear portion of the frame the forward member 17 thereof is lowered with respect to the tongue truck supporting wheel 32 by the crank arm 59, which, as before described, is swung forwardly by the movement of the rock shaft, and through such movement the link 61 is moved forwardly, releasing the tension on the chain, and as such tension is gradually released during continued movement of the crank screw the forward end of the member 17 slides down on the spindle portion 28 by gravity. When the hoe wheels have reached their normal operating position, or the lowermost position to which it is desired that they be capable of moving, the lower surface of the casting 24 will rest on the upper edge of the horizontal bottom portion 34 of the draft link 33, which edge acts as a stop to prevent further downward movement. The construction is such that in the lowering actuation of the single adjusting control 53, the front and rear ends of the frame both move down at approximately the same speed so that the position of the frame remains substantially parallel to itself or to its former positions, whereby the front and rear sets of hoe wheels are both caused to penetrate substantially to the same depth even if the implement should be given different depth adjustments. If it is desired to add the weight of the rear supporting wheels 13 to the weight of the frame to aid in penetration, which may be necessary in some instances owing to the condition of the soil, continued rotation of the crank screw will raise the wheels out of contact with the ground thus adding their weight to that of the implement, but this continued movement of the crank screw will not lower the forward end of the member 17 as the bottom of the casting 24 will rest on the upper edge of the lower draft link extension 34 which acts as a stop and prevents any further movement in a downward direction.

When it is desired to raise the hoe wheels to transport position the crank screw is turned in the opposite direction, and as will be readily understood, the front and rear portions of the frame will be simultaneously moved upwardly with respect to the rear supporting wheels and the tongue truck supporting wheel.

I claim:—

1. In a rotary hoe, the combination of a frame, rotary hoe elements carried by said frame, front and rear axles mounted on said frame, supporting wheels mounted on said axles, a rock shaft extending transversely of said frame and operatively connected for raising and lowering said frame relative to all of said supporting wheels, and means for operating said rock shaft.

2. In a rotary hoe, the combination of a frame, rotary hoe elements carried by said frame, front and rear axles mounted on said frame, supporting wheels mounted on said axles, a rock shaft extending transversely of said frame substantially in the plane thereof and operatively connected for raising and lowering said frame relatively to all of said supporting wheels and a screw shaft connected for operating said rock shaft.

3. In a rotary hoe, the combination of a frame, a plurality of hoe wheels carried by said frame, a supporting wheel for the rear portion of said frame, a supporting wheel for the front portion of said frame, mechanism for vertically adjusting said frame relatively to said rear supporting wheel, mechanism for vertically adjusting said frame relatively to said front supporting wheel, stop means for limiting the downward adjustment of the front portion of said frame, and a single operating device connected to actuate both of said adjusting mechanisms and operative to continue actuation of said rear wheel adjusting mechanism for raising said rear wheel off of the ground after said stop means has interrupted downward adjustment of the front portion of said frame.

4. In a rotary hoe, the combination of a frame, a series of hoe wheels mounted on said frame, supporting wheels for the rear end portion of the frame, a ground engaging wheel support for the front end portion of the frame, a transversely extending rock shaft carried by said frame, a crank arm secured to said rock shaft adjacent to each supporting wheel, means including a link connecting each of said crank arms with the adjacent supporting wheel, a third crank arm mounted on said rock shaft and operatively connected with said ground engaging wheel support, a crank screw mounted on said frame and operatively connected with said rock shaft for actuating the same to raise and lower said frame with respect to said supporting wheels and said ground engaging wheel support, and a stop carried by said ground engaging wheel support whereby when the hoe wheels are in predetermined working position further downward movement of the frame with respect to the ground engaging wheel support is prevented and continued rotation of the crank screw raises said supporting wheels off of the ground.

5. In a rotary hoe, the combination of a frame, front and rear shafts extending across said frame, a series of hoe wheels mounted on each of said shafts, supporting wheels for the rear portion of the frame, a ground engaging wheel support for the front portion of the frame, a transversely extending rock shaft, a crank screw operatively connected with said rock shaft to rock the same, a crank arm operatively connected to said rock shaft adjacent each supporting wheel, means connecting each of said crank arms with the adjacent supporting wheel, a third crank arm operatively connected to said rock shaft, and means connecting said crank arm with said ground engaging wheel support whereby by rotating said crank screw both ends of said frame are simultaneously raised or lowered at substantially the same speed, with respect to the supporting wheels and the ground engaging wheel support.

6. In a rotary hoe, the combination of a frame, front and rear shafts extending across said frame, a series of hoe wheels mounted on each of said shafts, supporting wheels for the rear portion of the frame, a dirigible tongue truck supporting the front portion of the frame, a transversely extending rock shaft, a crank screw, a traveling nut thereon operatively connected with said rock shaft to rock the same, a crank arm operatively connected to said rock shaft adjacent each supporting wheel, means connecting each of said crank arms with the adjacent supporting wheel for raising and lowering the frame relatively thereto a third crank arm operatively connected to said rock shaft, a chain connected at one end with said third crank arm and at the other end with said tongue truck, and a pulley mounted on the forward portion of said frame and around which a bight of said chain passes, whereby by rotating said crank screw both ends of said frame are simultaneously raised with respect to said supporting wheels and said tongue truck.

In witness whereof, I hereunto subscribe my name this 30th day of April, 1929.

CHRISTIAN E. JOHNSON.